US009630597B1

(12) United States Patent
Magyar

(10) Patent No.: US 9,630,597 B1
(45) Date of Patent: Apr. 25, 2017

(54) LANDING GEAR DEPLOYING SYSTEM

(71) Applicant: Keith Magyar, Owasso, OK (US)

(72) Inventor: Keith Magyar, Owasso, OK (US)

( * ) Notice: Subject to any disclaimer, the term of this patent is extended or adjusted under 35 U.S.C. 154(b) by 0 days.

(21) Appl. No.: 15/052,854

(22) Filed: Feb. 24, 2016

(51) Int. Cl.
*B60S 9/04* (2006.01)
(52) U.S. Cl.
CPC ...................... *B60S 9/04* (2013.01)
(58) Field of Classification Search
CPC ................................ B60S 9/02–9/04
See application file for complete search history.

(56) References Cited

U.S. PATENT DOCUMENTS

| | | |
|---|---|---|
| 2,875,980 A | 3/1959 | Grace |
| 3,984,082 A * | 10/1976 | Boettcher ................. B60S 9/04 254/426 |
| 4,116,315 A | 9/1978 | Vandenberg |
| 4,345,779 A | 8/1982 | Busby |
| 4,466,637 A | 8/1984 | Nelson |
| D317,769 S | 6/1991 | Vining, Sr. |
| 5,911,437 A * | 6/1999 | Lawrence ................. B60S 9/10 254/419 |
| 6,896,289 B2 | 5/2005 | Gross |

FOREIGN PATENT DOCUMENTS

WO    WO2005012080    2/2005

* cited by examiner

*Primary Examiner* — Erez Gurari

(57) ABSTRACT

A landing gear deploying system includes a trailer that has a pair of landing gear. The trailer includes a shaft extending between each of the landing gear. The landing gear is positionable in a deployed position to support the trailer over a support surface. The landing gear is positionable in a stored position. Thus, trailer may be coupled to a vehicle. A drive is coupled to an associated one of the landing gear and the drive is in mechanical communication with the shaft. The drive selectively rotates the shaft in a first direction such that each of the landing gear is urged into the deployed position. The drive selectively rotates the shaft in a second direction such that each of the landing gear is urged into the stored position.

5 Claims, 6 Drawing Sheets

LANDING GEAR DEPLOYING SYSTEM

BACKGROUND OF THE DISCLOSURE

Field of the Disclosure

The disclosure relates to deploying devices and more particularly pertains to a new deploying device for automatically deploying landing gear on a trailer.

SUMMARY OF THE DISCLOSURE

An embodiment of the disclosure meets the needs presented above by generally comprising a trailer that has a pair of landing gear. The trailer includes a shaft extending between each of the landing gear. The landing gear is positionable in a deployed position to support the trailer over a support surface. The landing gear is positionable in a stored position. Thus, trailer may be coupled to a vehicle. A drive is coupled to an associated one of the landing gear and the drive is in mechanical communication with the shaft. The drive selectively rotates the shaft in a first direction such that each of the landing gear is urged into the deployed position. The drive selectively rotates the shaft in a second direction such that each of the landing gear is urged into the stored position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
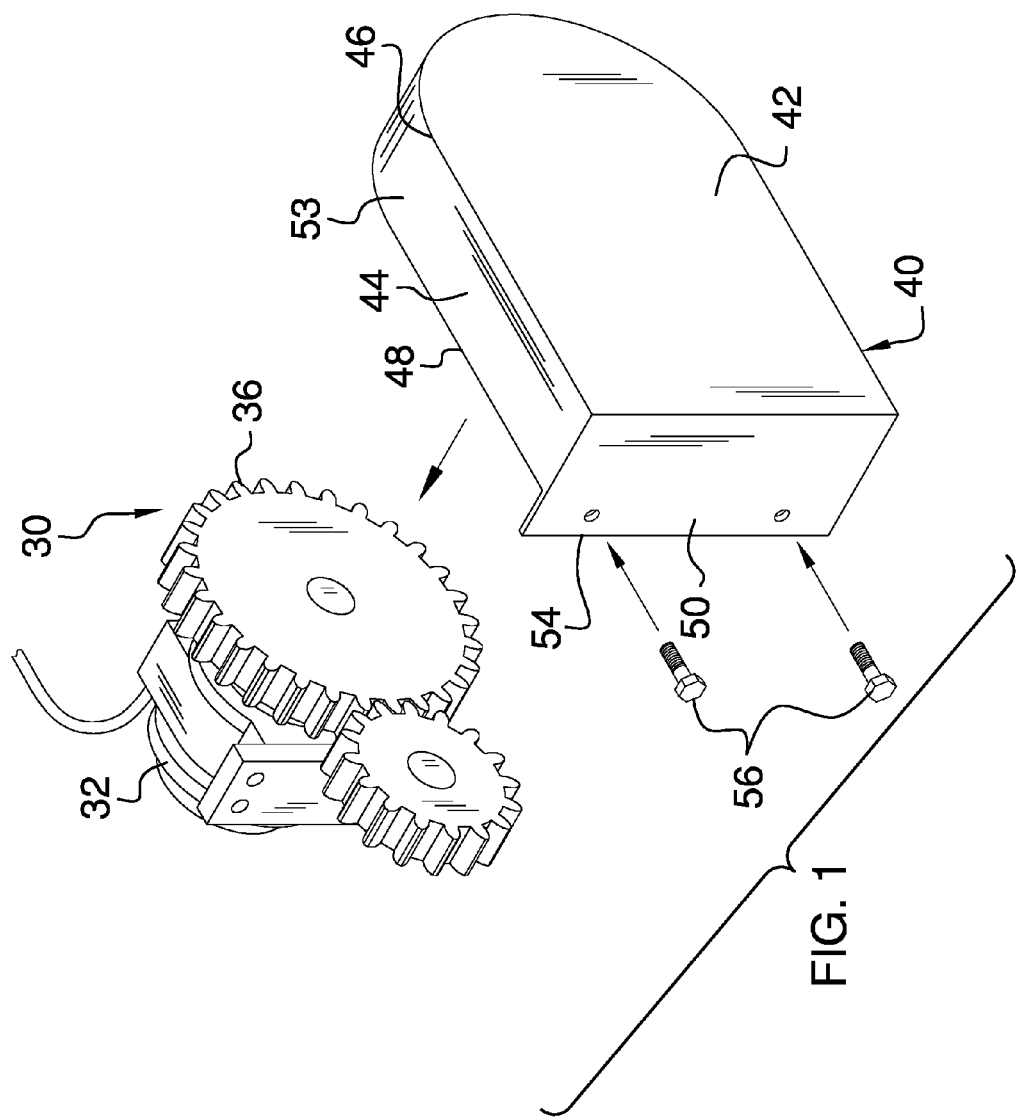
FIG. 1 is an exploded perspective view of a drive of a landing gear deploying system according to an embodiment of the disclosure.
Figure 2:
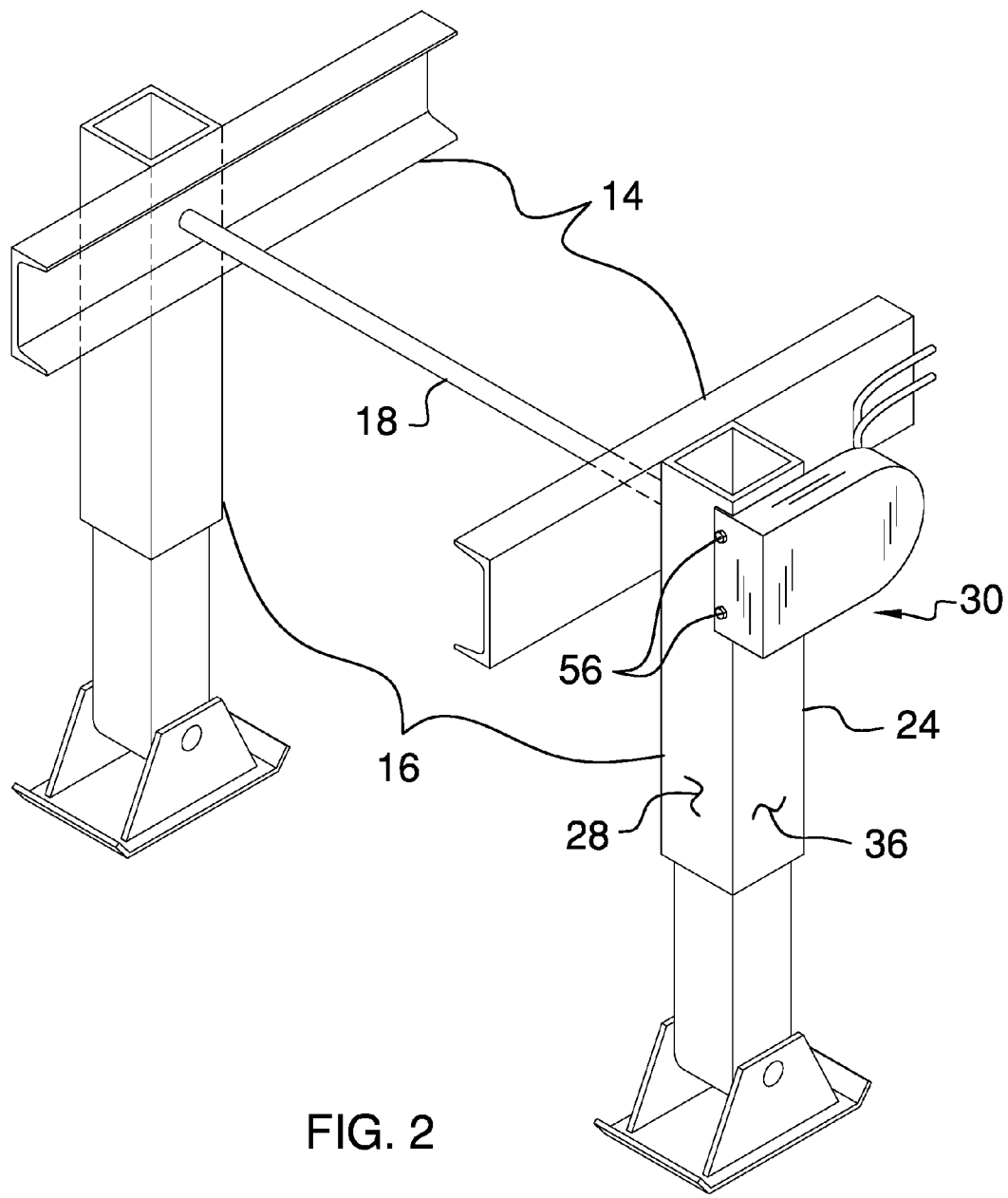
FIG. 2 is a front perspective view of an embodiment of the disclosure.
Figure 3:
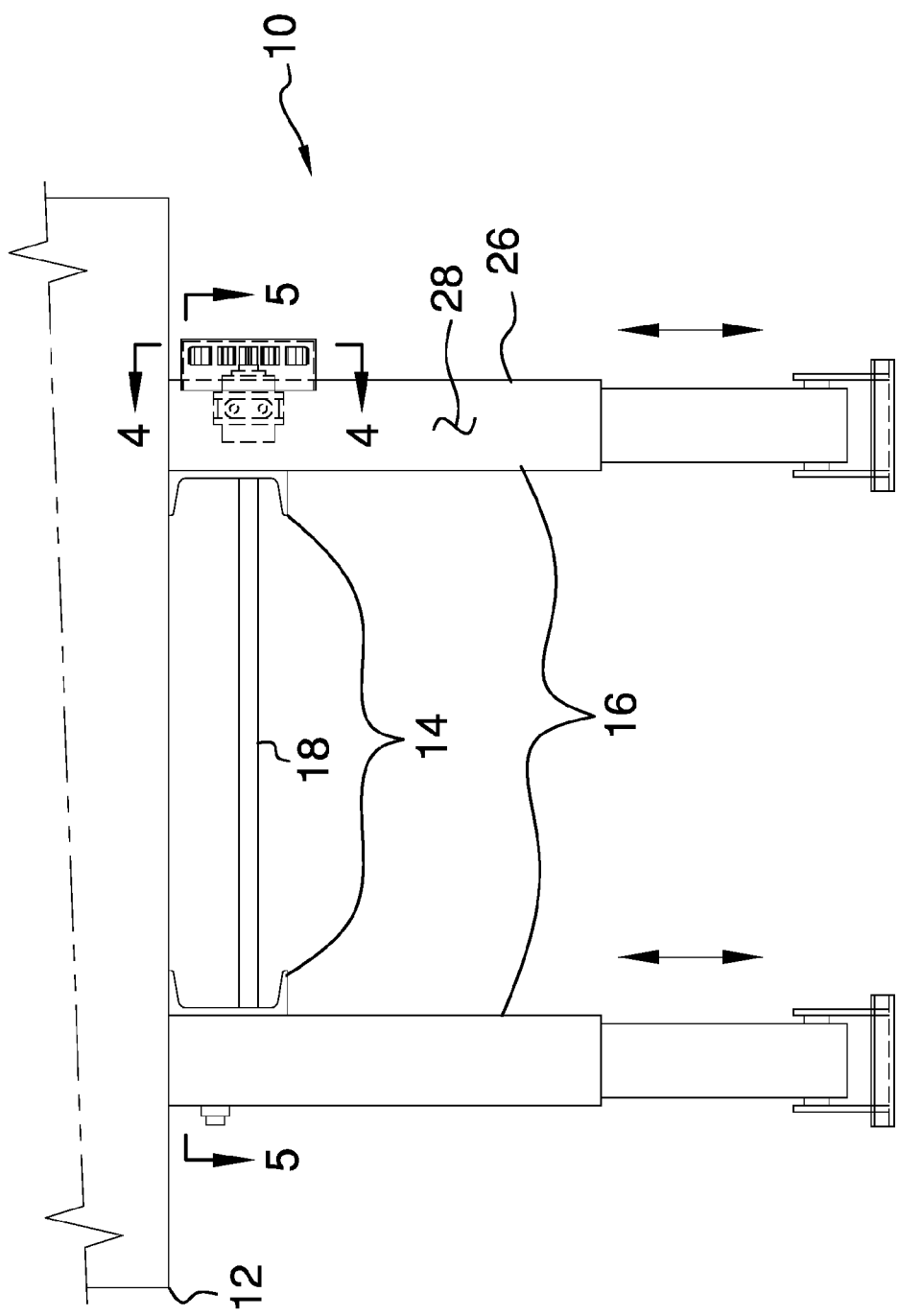
FIG. 3 is a front phantom view of an embodiment of the disclosure.
Figure 4:
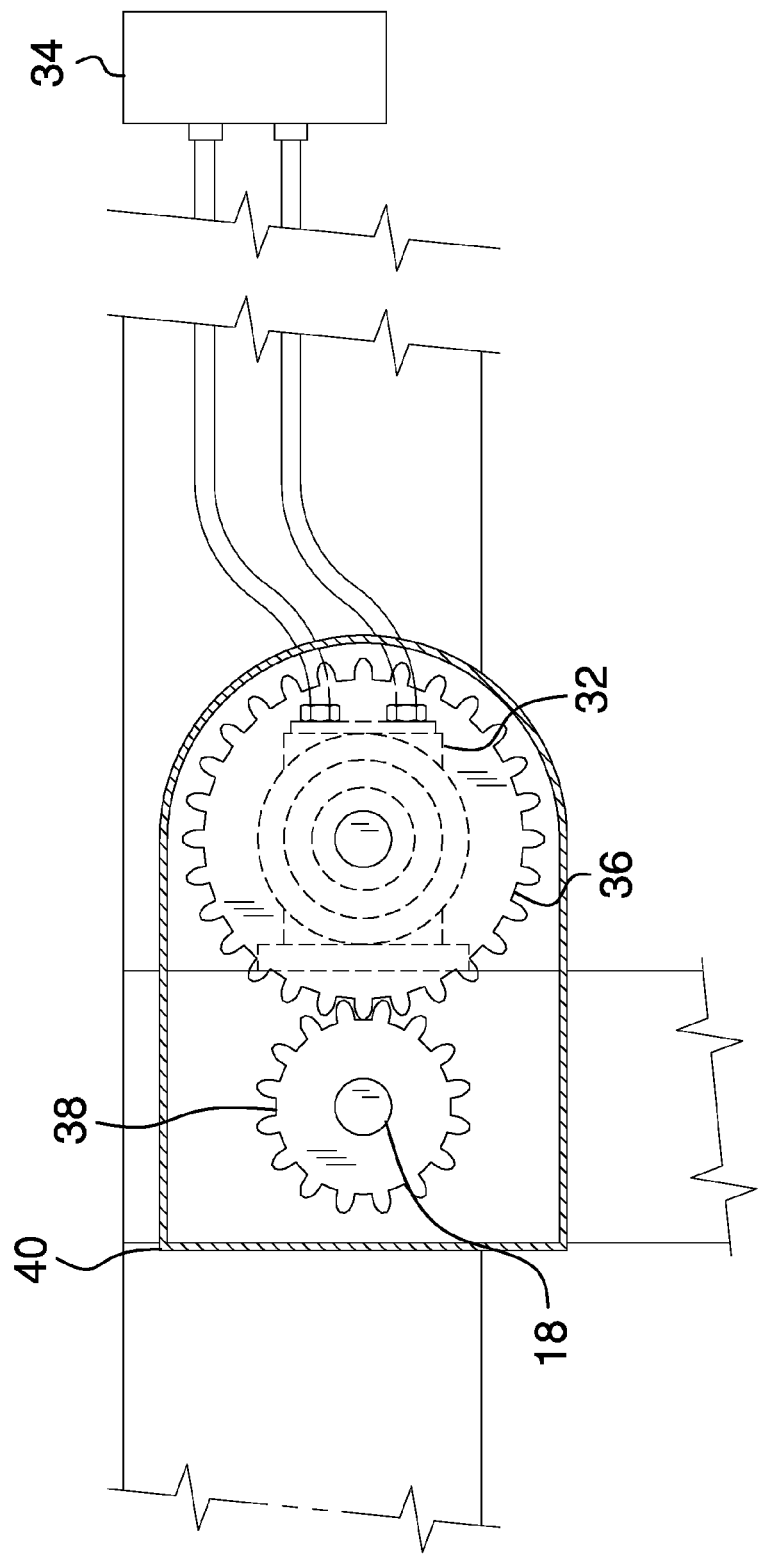
FIG. 4 is a cross sectional view taken along line 4-4 of FIG. 3 of an embodiment of the disclosure.
Figure 5:
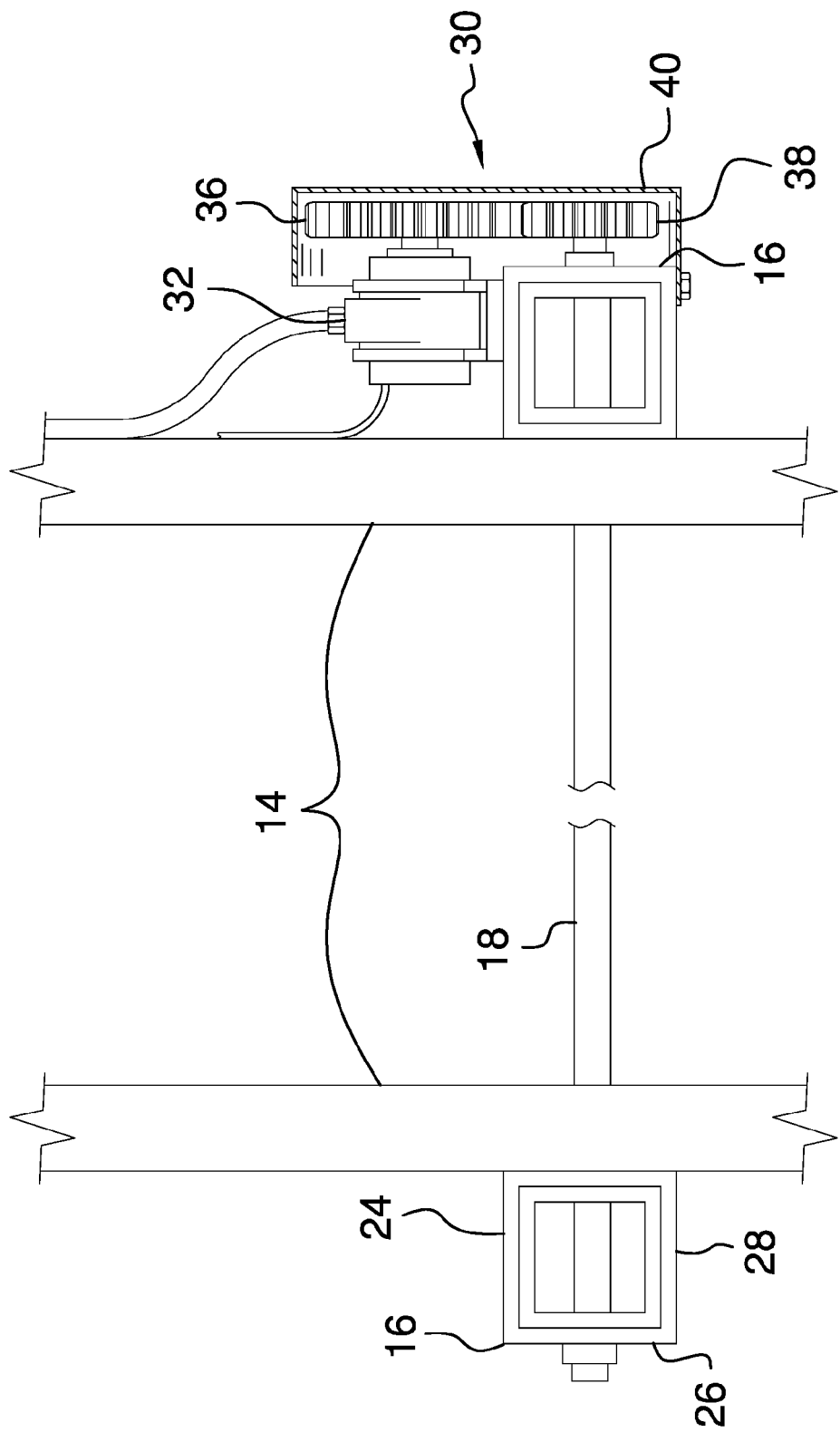
FIG. 5 is a cross sectional view taken along line 5-5 of FIG. 3 of an embodiment of the disclosure.
Figure 6:
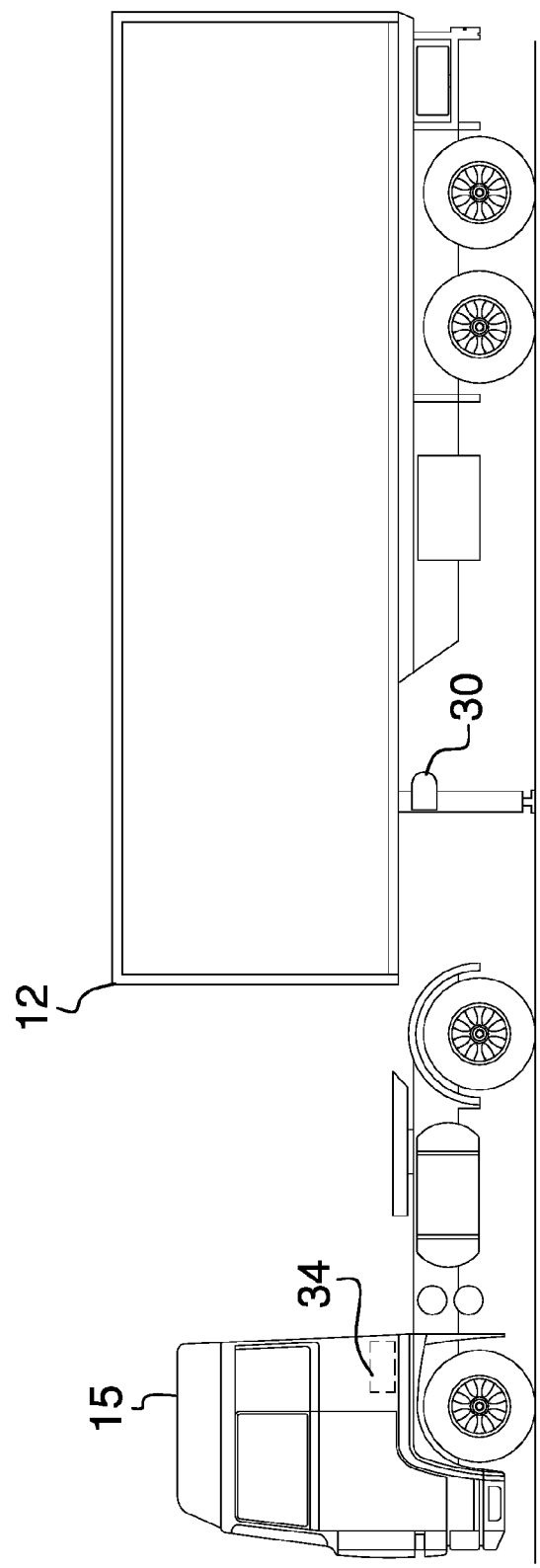
FIG. 6 is a perspective in-use view of an embodiment of the disclosure.

With reference now to the drawings, and in particular to FIGS. 1 through 6 thereof, a new deploying device embodying the principles and concepts of an embodiment of the disclosure and generally designated by the reference numeral 10 will be described.

As best illustrated in FIGS. 1 through 6, the landing gear deploying system 10 generally comprises a trailer 12 that has a frame 14 and a pair of landing gear 16. Each of the landing gear 16 is hingedly coupled to the frame 14. The trailer 12 includes a shaft 18 extending between each of the landing gear 16. The trailer 12 may comprise a semi trailer or the like. The trailer 12 may be coupled to a vehicle 15 and the vehicle 15 may comprise a semi tractor or the like.

The landing gear 16 is positionable in a deployed position having each of the landing gear 16 extending downwardly from the frame 14. Thus, each of the landing gear 16 may support the trailer 12 over a support surface 20. The landing gear 16 is positionable in a stored position having each of the landing gear 16 being coextensive with the frame 14. Thus, the trailer 12 may be coupled to a vehicle 15. Each of the landing gear 16 has a rear surface 24, an outwardly facing surface 26 and a front surface 28. The shaft 18 extends through the outwardly facing surface 26 corresponding to each of the landing gear 16.

A drive 30 is coupled to an associated one of the landing gear 16 and the drive 30 is in mechanical communication with the shaft 18. The drive 30 selectively rotates the shaft 30 in a first direction. Thus, each of the landing gear 16 is urged into the deployed position. The drive 30 selectively rotates the shaft 18 in a second direction. Thus, each of the landing gear 16 is urged into the stored position.

The drive 30 comprises a motor 32 that is coupled to the rear surface 24 of the associated landing gear 16. The motor 32 is in communication with a power source 34. The motor 32 may comprise a compressed air motor or the like. The power source 34 may comprise an air compressor on the vehicle 15 or the like. The motor 32 is selectively actuated to rotate in a first direction and a second direction. Moreover, the motor 32 may be controlled from the vehicle 15 through any conventional means.

A first gear 36 is rotatably coupled to the motor 32 such that motor 32 rotates the first gear 36 when the motor 32 is turned on. A second gear 38 is coupled to the shaft 30 such that the second gear 38 is positioned on the outwardly facing surface 26 of the associated landing gear 16. The second gear 38 is positioned to engage the first gear 36. The second gear 38 rotates the shaft 30 in the first direction when the motor 32 rotates in the first direction. The second gear 38 rotates the shaft 30 in the second direction when the motor 32 rotates in the second direction.

A cover 40 is provided. The cover 40 has a first wall 42 and a peripheral wall 44 coupled to and extending laterally away from the first wall 42. The peripheral wall 44 is coextensive with an outer edge 46 of the first wall 42. The peripheral wall 44 has a distal edge 48 with respect to the first wall 42.

The peripheral wall 44 has a first side 50 and a second side 52. The first side 50 extends beyond the second side 52 to define a lip 54. The distal edge 48 corresponding to the second side 52 abuts the outwardly facing surface 26 corresponding to the associated landing gear 16. Thus, each of the motor 32, the first gear 36 and the second gear 38 are concealed by the cover 40. The lip 54 abuts the front surface 28 of the associated landing gear 16.

A pair of bolts 56 is provided. Each of the bolts 56 extends through the lip 54 and engages the front surface 28 of the associated landing gear 16. Thus, the cover 40 is removably coupled to the associated landing gear 16.

In use, the motor 32 is actuated to rotate in the first direction when the trailer 12 is to be uncoupled from the vehicle 15. Thus, the landing gear 16 is positioned in the deployed position to support the trailer 12. The motor 32 is actuated to rotate in the second direction when the trailer 12 is coupled to the vehicle 15. Thus, the landing gear 16 is positioned in the stored position thereby facilitating the vehicle 15 to support the trailer 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A landing gear deploying system comprising:
a trailer having a frame and a pair of landing gear, each of said landing gear being hingedly coupled to said frame, said trailer including a shaft extending between each of said landing gear, said landing gear being positionable in a deployed position having each of said landing gear extending downwardly from said frame wherein each of said landing gear is configured to support said trailer over a support surface, said landing gear being positionable in a stored position having each of said landing gear being coextensive with said frame wherein said trailer is configured to be coupled to a vehicle;
a drive being coupled to an associated one of said landing gear, said drive being in mechanical communication with said shaft, said drive selectively rotating said shaft in a first direction such that each of said landing gear are urged into said deployed position, said drive selectively rotating said shaft in a second direction such that each of said landing gear are urged into said stored position, said drive being configured to be in communication with a power source;
a motor;
a first gear;
a second gear; and
a cover having a first wall and a peripheral wall being coupled to and extending laterally away from said first wall, said peripheral wall being coextensive with an outer edge of said first wall, said peripheral wall having a distal edge with respect to said first wall, said peripheral wall having a first side and a second side, said first side extending beyond said second side to define a lip, said distal edge corresponding to said second side abutting an outwardly facing surface corresponding to said associated landing gear having said motor, said first gear and said second gear being concealed by said cover, said lip abutting a front surface of said associated landing gear.

2. The system according to claim 1, wherein:
each of said landing gear has a rear surface, an outwardly facing surface and a front surface, said shaft extending through said outwardly facing surface corresponding to each of said landing gear; and
said drive comprises a motor being coupled to said rear surface of said associated landing gear, said motor being configured to be in communication with a power source, said motor being selectively actuated to rotate in a first direction and a second direction.

3. A landing gear deploying system comprising:
a trailer having a frame and a pair of landing gear, each of said landing gear being hingedly coupled to said frame, said trailer including a shaft extending between each of said landing gear, said landing gear being positionable in a deployed position having each of said landing gear extending downwardly from said frame wherein each of said landing gear is configured to support said trailer over a support surface, said landing gear being positionable in a stored position having each of said landing gear being coextensive with said frame wherein said trailer is configured to be coupled to a vehicle;
a drive being coupled to an associated one of said landing gear, said drive being in mechanical communication with said shaft, said drive selectively rotating said shaft in a first direction such that each of said landing gear are urged into said deployed position, said drive selectively rotating said shaft in a second direction such that each of said landing gear are urged into said stored position, said drive being configured to be in communication with a power source;
each of said landing gear has a rear surface, an outwardly facing surface and a front surface, said shaft extending through said outwardly facing surface corresponding to each of said landing gear;
said drive comprises a motor being coupled to said rear surface of said associated landing gear, said motor being configured to be in communication with a power source, said motor being selectively actuated to rotate in a first direction and a second direction;
a first gear being rotatably coupled to said motor such that said motor rotates said first gear when said motor is turned on; and
a second gear being coupled to said shaft such that said second gear is positioned on said outwardly facing surface of said associated landing gear, said second gear being positioned to engage said first gear, said second gear rotating said shaft in said first direction when said motor rotates in said first direction, said second gear rotating said shaft in said second direction when said motor rotates in said second direction.

4. The system according to claim 1, further comprising a pair of bolts, each of said bolts extending through said lip and engaging said front surface of said associated landing gear such that said cover is removably coupled to said associated landing gear.

5. A landing gear deploying system comprising:
a trailer having a frame and a pair of landing gear, each of said landing gear being hingedly coupled to said frame, said trailer including a shaft extending between each of said landing gear, said landing gear being positionable in a deployed position having each of said landing gear extending downwardly from said frame wherein each of said landing gear is configured to support said trailer over a support surface, said landing gear being positionable in a stored position having each of said landing gear being coextensive with said frame wherein said trailer is configured to be coupled to a vehicle, each of said landing gear having a rear surface, an outwardly facing surface and a front surface, said shaft extending through said outwardly facing surface corresponding to each of said landing gear; and a drive being coupled to an associated one of said landing gear, said drive being in mechanical communication with said shaft, said drive selectively rotating said shaft in a first direction such that each of said landing gear are urged into said deployed position, said drive selectively rotating said shaft in a second direction such that each of said landing gear are urged into said stored position, said drive comprising:
  a motor being coupled to said rear surface of said associated landing gear, said motor being configured to be in communication with a power source, said motor being selectively actuated to rotate in a first direction and a second direction,
  a first gear being rotatably coupled to said motor such that motor rotates said first gear when said motor is turned on,
  a second gear being coupled to said shaft such that said second gear is positioned on said outwardly facing surface of said associated landing gear, said second gear being positioned to engage said first gear, said second gear rotating said shaft in said first direction when said motor rotates in said first direction, said second gear rotating said shaft in said second direction when said motor rotates in said second direction,
  a cover having a first wall and a peripheral wall being coupled to and extending laterally away from said first wall, said peripheral wall being coextensive with an outer edge of said first wall, said peripheral wall having a distal edge with respect to said first wall, said peripheral wall having a first side and a second side, said first side extending beyond said second side to define a lip, said distal edge corresponding to said second side abutting said outwardly facing surface corresponding to said associated landing gear having said motor, said first gear and said second gear being concealed by said cover, said lip abutting said front surface of said associated landing gear, and
  a pair of bolts, each of said bolts extending through said lip and engaging said front surface of said associated landing gear such that said cover is removably coupled to said associated landing gear.

* * * * *